United States Patent
Patriarche

(10) Patent No.: US 10,783,699 B2
(45) Date of Patent: Sep. 22, 2020

(54) SUB-VOXEL REFINEMENT OF ANATOMICAL MODELS

(71) Applicant: AI ANALYSIS, INC., Bellevue, WA (US)

(72) Inventor: Julia Patriarche, Bellevue, WA (US)

(73) Assignee: AI Analysis, Inc., Bellevue, WA (US)

( * ) Notice: Subject to any disclaimer, the term of this patent is extended or adjusted under 35 U.S.C. 154(b) by 0 days.

(21) Appl. No.: 16/279,810

(22) Filed: Feb. 19, 2019

(65) Prior Publication Data

US 2019/0259197 A1 Aug. 22, 2019

Related U.S. Application Data

(60) Provisional application No. 62/710,457, filed on Feb. 16, 2018.

(51) Int. Cl.
 *G06T 15/08* (2011.01)
 *G06T 19/00* (2011.01)

(52) U.S. Cl.
 CPC .............. *G06T 15/08* (2013.01); *G06T 19/00* (2013.01); *G06T 2210/41* (2013.01)

(58) Field of Classification Search
 CPC . G06T 2207/10088; G06T 2207/20128; G06T 7/11; G06T 7/0012; G06T 2207/30016; G06T 2207/10081; G06T 7/149; G06T 2210/41; G06T 7/0014; G06T 17/00; G06T 2207/30004; G06T 2207/30048; G06T 11/003; G06T 15/08; G06T 19/00; G06T 19/20; G06T 2200/04; G06T 2207/20016; G06T 2207/20081; G06T 2207/30101; G06T 2207/30104; G06T 2219/2016; G06T 7/174; G01R 33/56341; G01R 33/5608; A61B 6/5229; A61N 5/1039; G06K 9/3233;
(Continued)

(56) References Cited

U.S. PATENT DOCUMENTS

2006/0143215 A1\* 6/2006 Truyen ................. G06T 11/008
2010/0128946 A1\* 5/2010 Fidrich ..................... G06T 7/11
 382/131
(Continued)

OTHER PUBLICATIONS

Nithiananthan, Sajendra, et al. "Demons deformable registration of CT and cone-beam CT using an iterative intensity matching approach." Medical physics 38.4 (2011): 1785-1798. (Year: 2011).*

Primary Examiner — Xiao M Wu
Assistant Examiner — Scott E Sonners
(74) Attorney, Agent, or Firm — Olympic Patent Works PLLC

(57) ABSTRACT

The current document is directed to methods and systems that refine anatomical models to sub-voxel resolution. In certain implementations, sophisticated, composite, digital anatomical atlases provide detailed three-dimensional models of the contents of three-dimensional medical images. However, three-dimensional medical images have limited resolutions characterized by a smallest volume, referred to as a voxel, to which an intensity is assigned by the imaging process. The currently disclosed methods employ computed percentages of different types of tissue within voxel volumes to adjust a three-dimensional model of the contents of the voxel volumes to more accurately model the contents of the voxel volumes.

19 Claims, 22 Drawing Sheets

(58) Field of Classification Search
CPC ......... G06K 2209/051; G06K 9/00127; G06K 9/00147; G06K 9/4638; G06K 9/6228; G06K 9/6267; G16H 50/20; Y10S 128/922
See application file for complete search history.

(56) References Cited

U.S. PATENT DOCUMENTS

| | | | | |
|---|---|---|---|---|
| 2013/0044927 | A1* | 2/2013 | Poole | G06T 7/0014 |
| | | | | 382/131 |
| 2014/0079338 | A1* | 3/2014 | Siewerdsen | G06T 7/0012 |
| | | | | 382/284 |
| 2017/0221208 | A1* | 8/2017 | Dyer | G01R 33/5608 |
| 2018/0330506 | A1* | 11/2018 | Grady | G06T 7/149 |
| 2019/0102516 | A1* | 4/2019 | Schieke | G16H 30/40 |

* cited by examiner

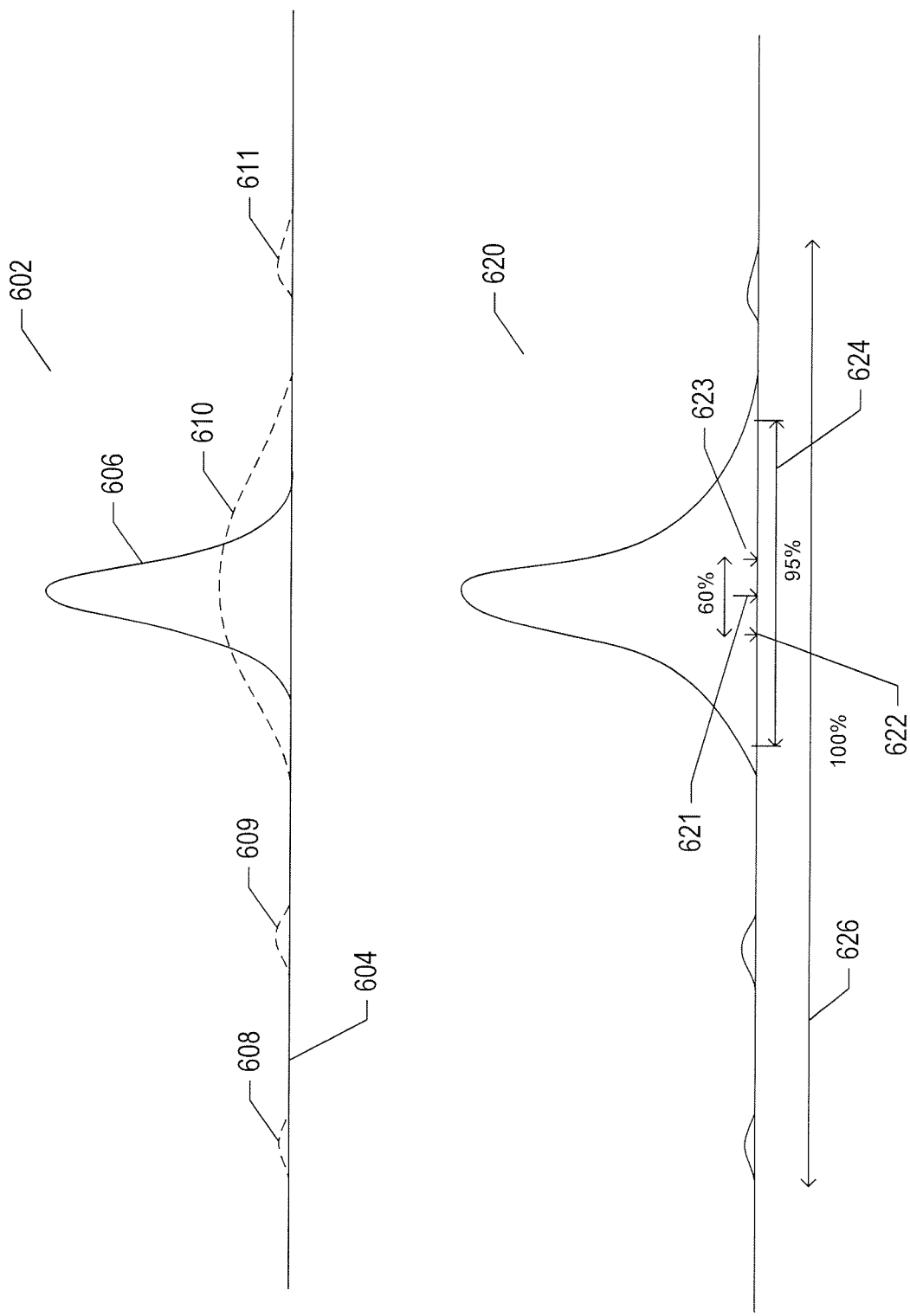

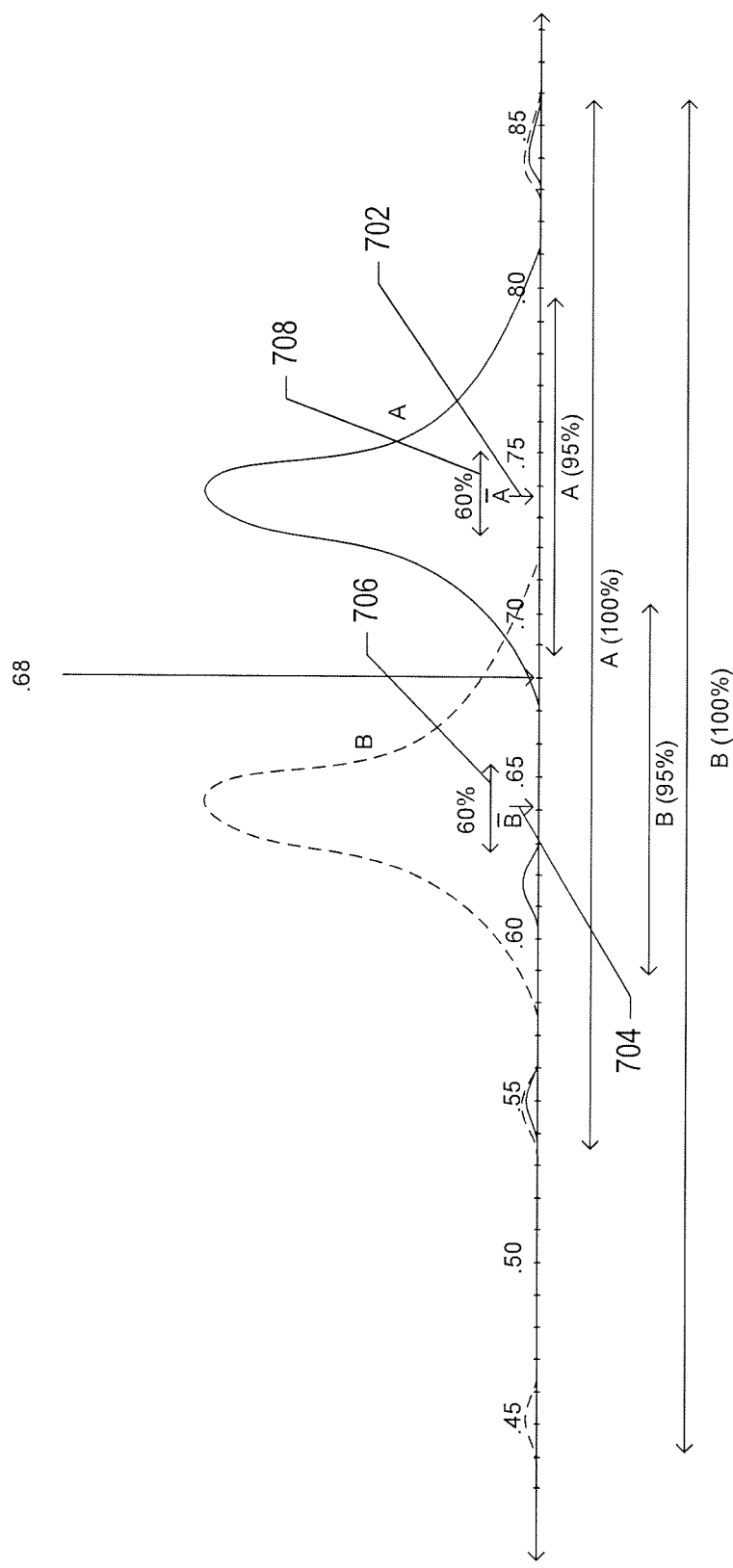

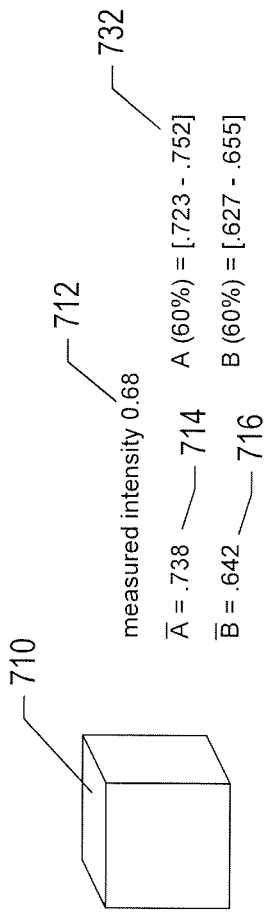
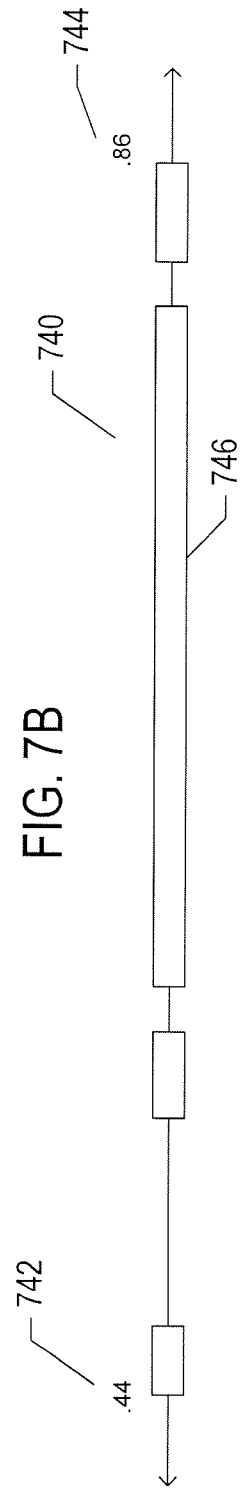
FIG. 7B

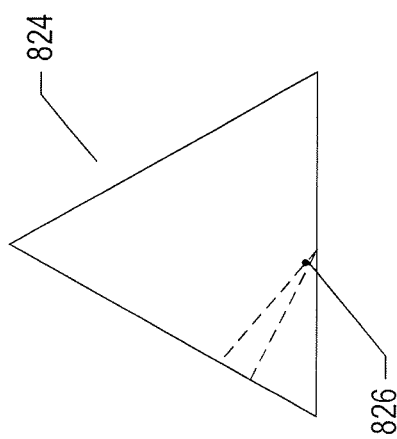
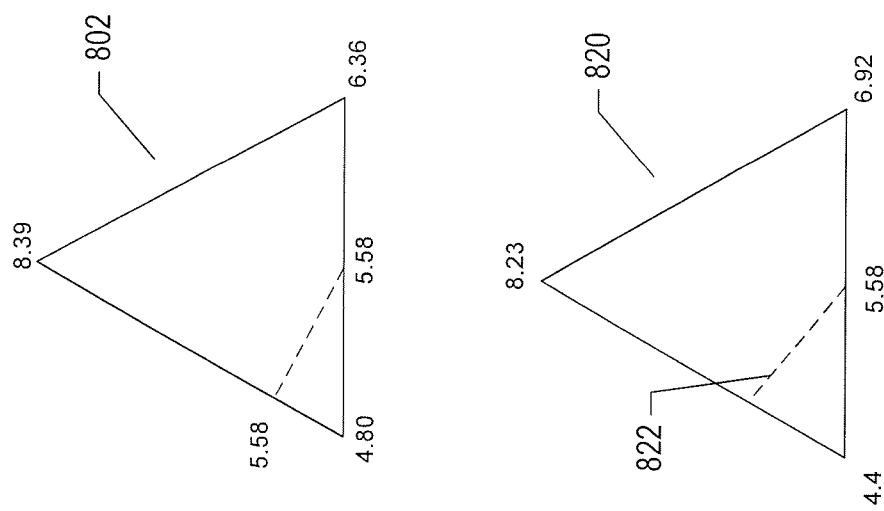
FIG. 8C

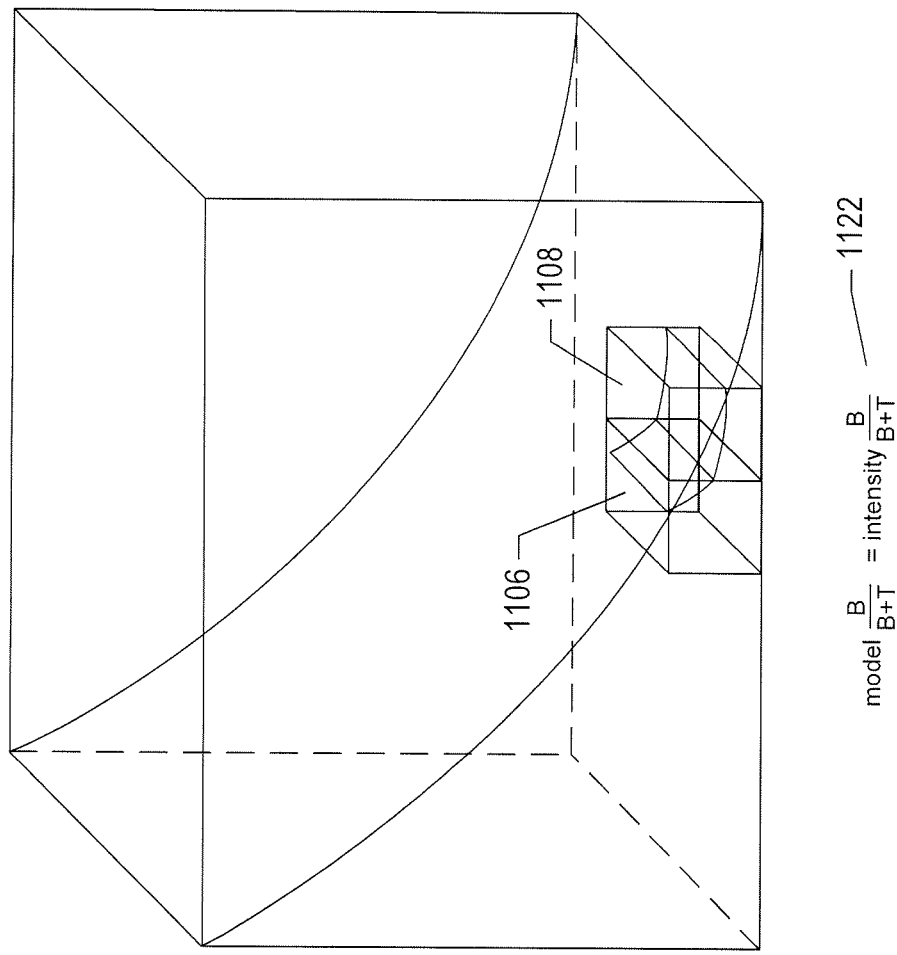

SUB-VOXEL REFINEMENT OF ANATOMICAL MODELS

CROSS-REFERENCE TO RELATED APPLICATION

This application claims the benefit of Provisional Application No. 62/710,457, filed Feb. 16, 2018, which is incorporated by reference in its entirety.

TECHNICAL FIELD

The current document is directed to medical imaging and, in particular, to methods and systems that refine anatomical models at sub-voxel resolution.

BACKGROUND

Since the discovery of x-rays at the end of the nineteenth century and the subsequent development of medical x-ray imaging, in the early twentieth century, medical imaging has rapidly developed to be one of the most precise, informative, and widely used diagnostic methods in modern medicine. Early projective x-ray imaging, including film-based imaging and fluoroscopy, has been superseded by complex, computer-controlled imaging devices, such as computed-tomography scanners. A variety of additional types of imaging, including magnetic-resonance imaging, have been added to the many imaging tools available to modern diagnosticians. While the resolution and contrast achieved by medical imaging have continued to rapidly advance, and while many new methods and systems are available for displaying medical images to medical professionals, many problems associated with interpreting medical images and using medical images for diagnostic and treatment-planning purposes remain. With increased computational power and rapidly advancing automation and machine-learning methodologies, computational methods for automating medical-image interpretation are currently being developed in order to address many of these problems. Designers, developers, and users of medical-imaging systems continue to seek new and improved automated systems and methods for interpreting medical images to facilitate medical diagnosis and treatment planning.

SUMMARY

The current document is directed to methods and systems that refine anatomical models to sub-voxel resolution. In certain implementations, sophisticated, composite, digital anatomical atlases provide detailed three-dimensional models of the contents of three-dimensional medical images. However, three-dimensional medical images have limited resolutions characterized by a smallest volume, referred to as a voxel, to which an intensity is assigned by the imaging process. The resolution may vary with device configurations and imaging technologies but, in general, the volume of a voxel is often millions to billions of times larger than the volume of a human cell. Sophisticated, composite anatomical atlases may provide three-dimensional models at a higher resolution than that provided by a given medical-imaging technique, but, to date, it is not been possible to accurately correlate such models with medical images obtained from individual patients at resolutions finer than the resolution of the medical images. The currently disclosed methods employ computed percentages of different types of tissue within a voxel volume, the volume of a patient's body corresponding to a voxel in a medical image, to adjust a three-dimensional model of the contents of the voxel volume to more accurately model the contents of the voxel volume. By refining anatomical models to sub-voxel resolutions, more precise understanding of changes in an individual's anatomy, such as the growth or deformation of a tumor, can be obtained by diagnosticians and treatment planners.

BRIEF DESCRIPTION OF THE DRAWINGS

FIG. 6 illustrates the intensity profile of a particular type of tissue.

FIGS. 7A-B illustrate partial-volume intensities.

FIGS. 8A-C illustrate an example of three-way partial-volume intensity. FIG. 8A shows two different sets of intensity profiles for three tissue types A, B, and C.

FIGS. 11A-D illustrate an example of operation of the currently disclosed sub-voxel-resolution model refinement methods and systems.

DETAILED DESCRIPTION

The current document is directed to methods and systems that refine anatomical models to sub-voxel resolution. In the following discussion, overviews of anatomical atlases and medical imaging are first provided with reference to FIGS. 1-5. Then, the effects of multiple tissues within a voxel volume on the intensity measured for the corresponding voxel by medical-imaging techniques are discussed with reference to FIGS. 6-8C. Finally, the currently disclosed methods for refining three-dimensional models are discussed with reference to FIGS. 9-12C.

Figure 1:
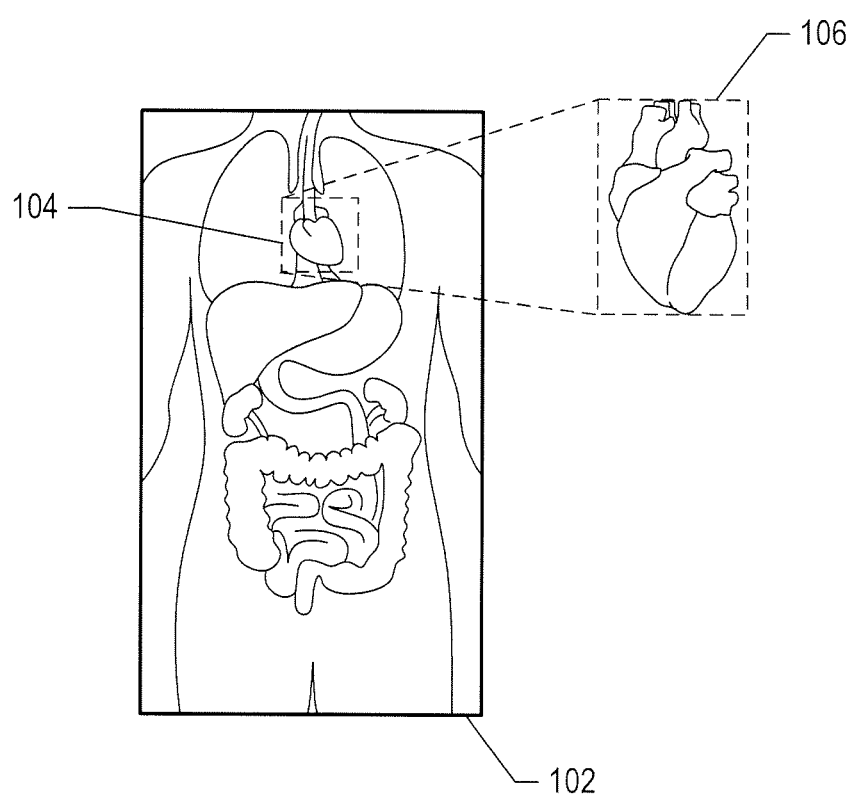
FIG. 1 illustrates an anatomical atlas.

FIG. 1 illustrates an anatomical atlas. An anatomical atlas provides a graphical representation of the human anatomy at various levels of detail. For example, a first level of detail may show an overview of the internal organs within the torso 102. A user may select some portion of that representation, such as the portion included within the dashed rectangle 104, and then obtain greater detail for that portion in an expanded view of the selected portion 106. The process may continue over many dimensional scales, from tens to hundreds of centimeters down to millimetres and smaller dimensions. The current methods and systems employ a digital, computer-implemented anatomical atlas that provides graphical displays of selected portions of the anatomy as well as digital models of selected portions of the anatomy. There are many different ways to digitally represent anatomical features, including high-resolution image-like representations and various types of computational representations of the various surfaces that represent boundaries between different tissue types along with digital annotations of the various organs, chambers, vessels, and other features contained within the surfaces. For purposes of disclosing the current methods and systems, the exact type of digital representations used to represent human anatomy need not be discussed in detail, other than the fact that these digital representations can be correlated with corresponding medical images to allow the images to be interpreted, as further discussed below.

Figure 2:
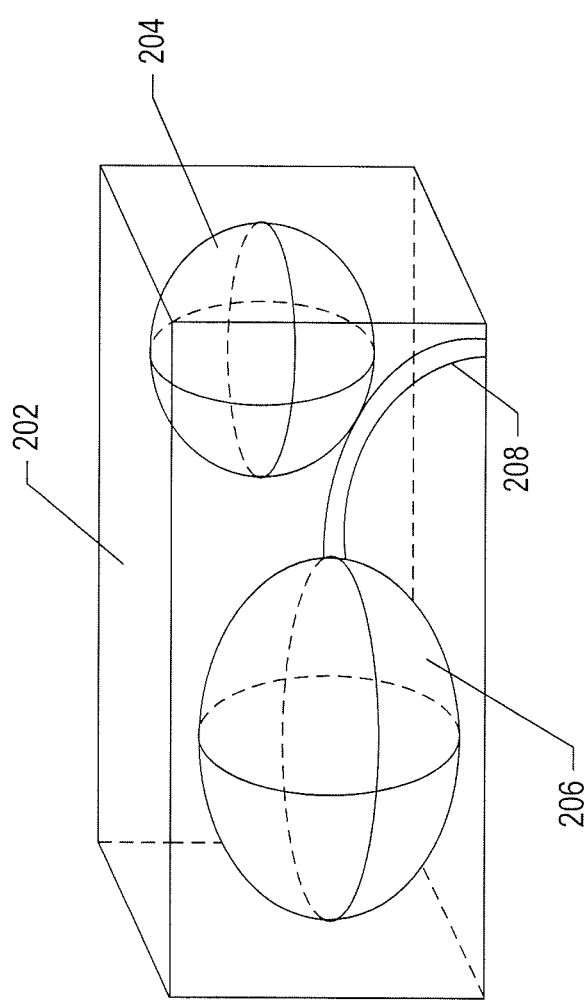
FIG. 2 shows an abstract representation of a volume of a human body containing several features described by an anatomical atlas.

FIG. 2 shows an abstract representation of a volume of a human body containing several features described by an anatomical atlas. The rectangular-prism-shaped volume 202 includes representations of two chamber-like features 204 and 206 along with a portion of a vessel 208 emanating from the chamber-like feature 206. As further discussed below, the current methods and systems are directed to three-dimensional anatomical representations, or models, and corresponding three-dimensional images generated by any of various medical-imaging techniques. A digital anatomical atlas generally provides interfaces to allow a user or an accessing computational entity to specify particular volumes within the human body and obtain a model of the contents of that volume. The model may be displayed on a display monitor, two-dimensional or three-dimensional views of the model may be printed, and the model may be exported to other computational entities for use in automated medical-image interpretation.

Figure 3A:
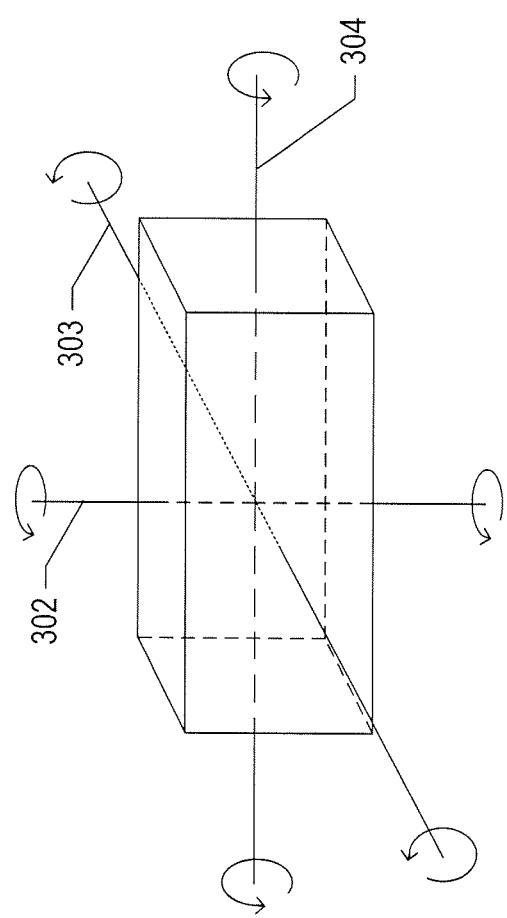
FIGS. 3A-C illustrate certain of computational operations provided by a digital anatomical atlas.
Figure 3B:
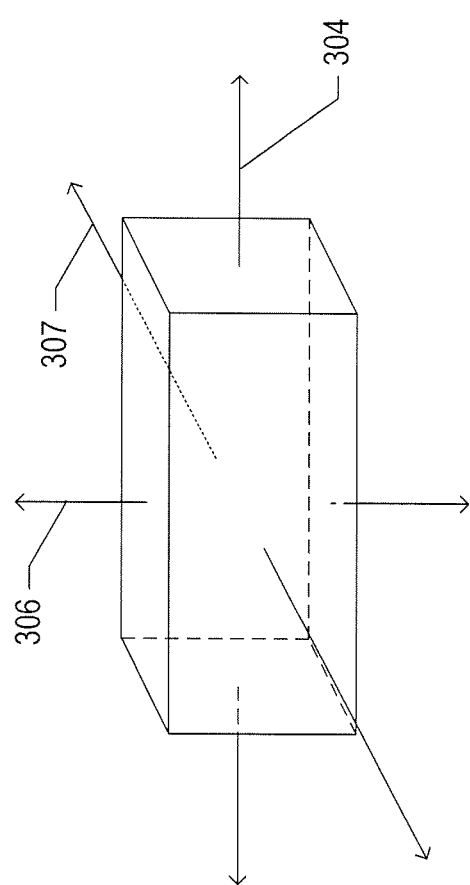
Figure 3C:
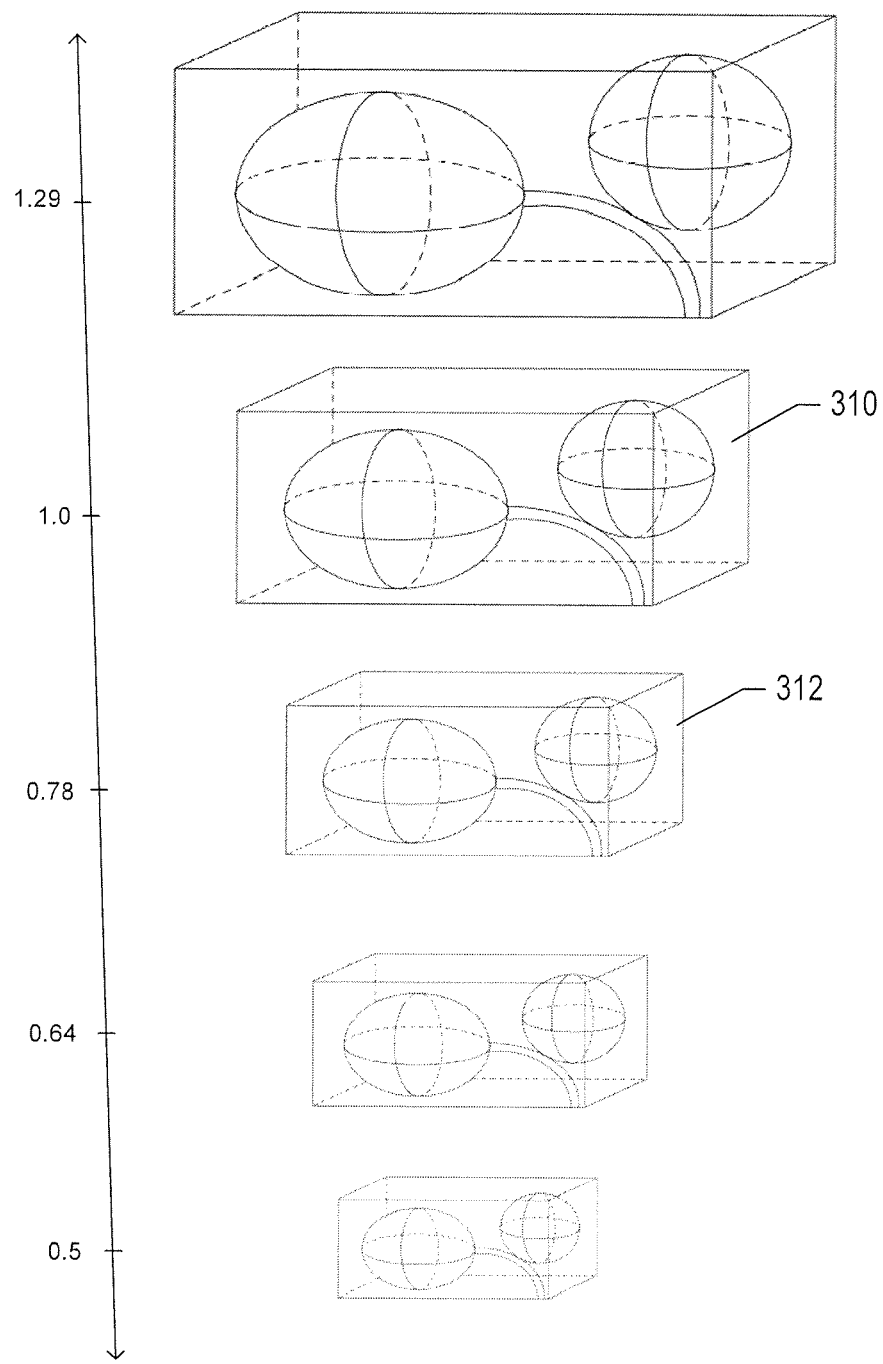

A digital anatomical atlas provides a variety of different computational operations with respect to models of selected anatomical volumes. FIGS. 3A-C illustrate certain of computational operations provided by a digital anatomical atlas. As shown in FIG. 3A, a selected model volume can be re-oriented arbitrarily. For example, as shown in FIG. 3A, the model may be rotated with respect to three mutually orthogonal axes 302-304 to any arbitrary orientation in space. As shown in FIG. 3B, the model volume can be translated arbitrarily in space. For example, as shown in FIG. 3B, the model can be translated along three mutually orthogonal spatial directions 306-308. The combination of orientation operations and translation operations can be used to position and orient the model volume arbitrarily in three-dimensional space. As shown in FIG. 3C, a model volume may be arbitrarily dimensionally resealed to an arbitrary size represented by a real or floating-point multiplier, referred to as a "scaling factor." In FIG. 3C, for example, a particular model volume 310 is arbitrarily assigned the scale value 1.0, and multiplying that scale value by a scaling factor produces a resized version of the model volume, such as the resized model volume 312 obtained by multiplying the scale 1.0 by the scaling factor 0.78. In general, a digital anatomical atlas may also provide more complex operations that allow a model to be systematically deformed by various isotropic and anisotropic stretching, twisting, bending, compressing, and expanding operations. These types of operations are generally referred to, below, as warping operations.

Figure 4:
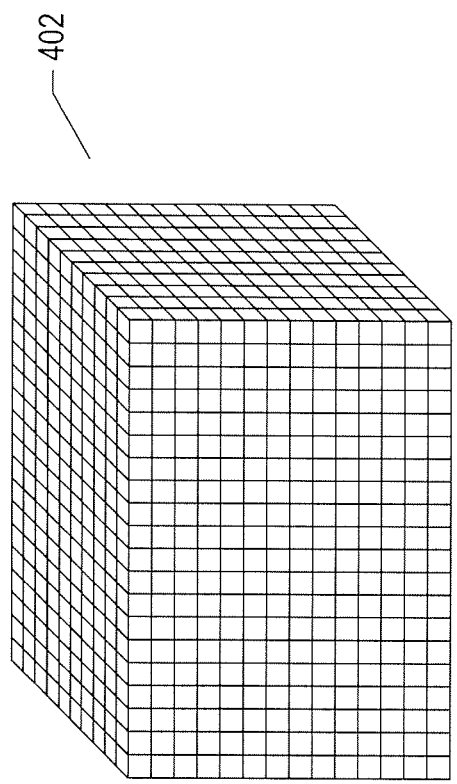
FIG. 4 illustrates a three-dimensional medical image.

FIG. 4 illustrates a three-dimensional medical image. The medical image 402 is represented as a volume containing multiple voxels. Voxels are the three-dimensional equivalents of pixels in two-dimensional images. The multiple voxels completely fill the entire medical-image volume. Each voxel is associated with an intensity value, a floating-point value representing the image intensity within the grayscale range [0,1.0], where 1.0 represents white, 0 represents black, and intermediate fractional values from 0 to 1 represent a sequence of increasingly lighter gray. In general, different types of tissue produce different grayscale values under any given set of instrumental and imaging conditions. Boundaries between tissues are recognized by the grayscale contrast along a generally curved surface separating the two different tissues. A voxel corresponds to a voxel volume within a patient's body.

Figure 5:
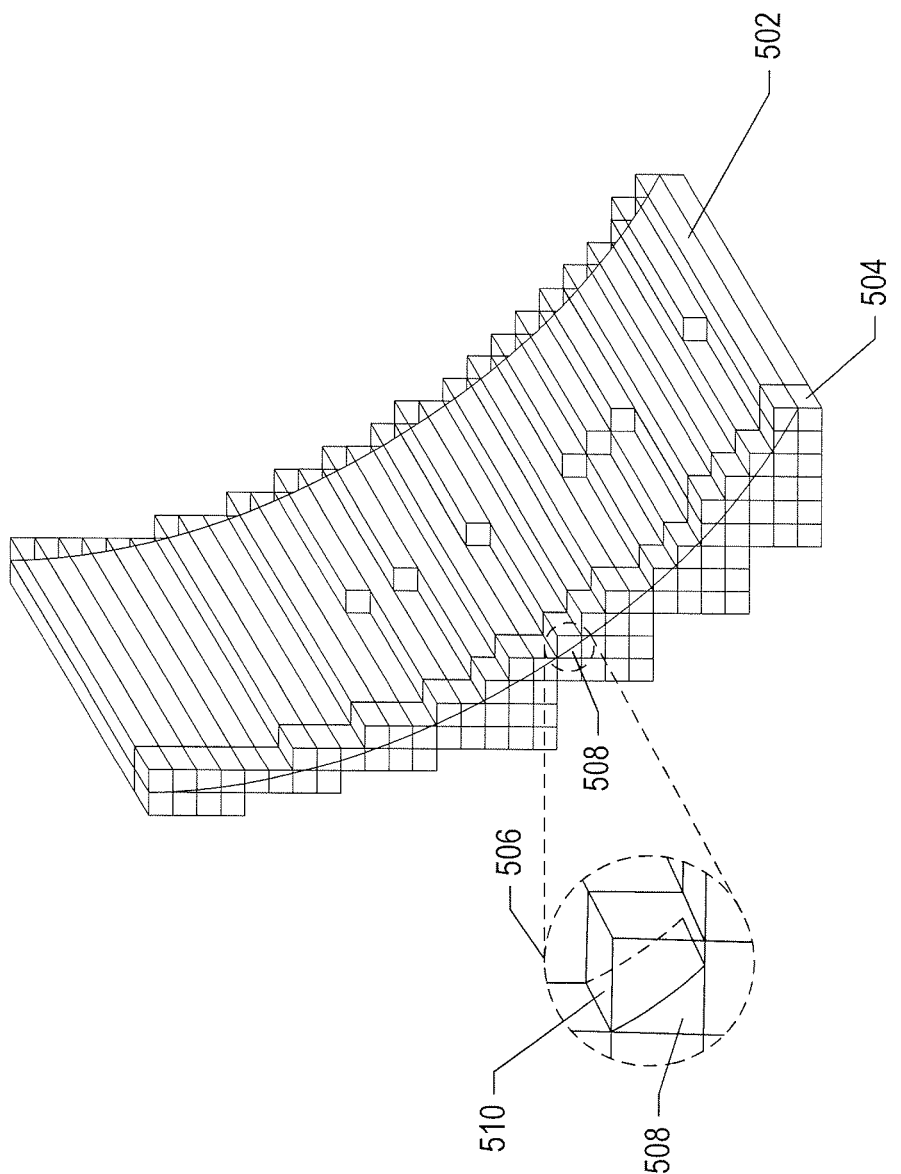
FIG. 5 illustrates resolution constraints of medical images relative to anatomical-atlas models.

FIG. 5 illustrates resolution constraints of medical images relative to anatomical-atlas models. In FIG. 5, a curved model surface 502 is shown positioned within a number of voxels, such as voxel 504 of the corresponding medical image. The voxels represent the finest resolution available from the medical image, since each voxel is associated with a single scalar intensity value representing the contents of the entire voxel. However, as shown in inset 506, which contains a magnified representation of voxel 508, the resolution of the model surface may be significantly higher. The curved surface model is positioned within the corresponding voxels of the three-dimensional medical image so that the portion of the model surface 510 within the voxel appears to nearly diagonally bisect the voxel. As further discussed below, model surfaces can be placed in correspondence with the digital image up to some level of precision, but the positioning of a portion of the model surface within the voxel cannot be justified by the medical-image data, since there is insufficient information in a single scalar intensity value for a voxel to indicate where the model surface within the voxel lies. In other words, digital anatomical model volumes may have significantly higher resolution than the corresponding medical images. However, it is often desirable to try to ascertain the positions of model surfaces within voxels, since the greater resolution represented by such positioning may be critical for diagnosing pathologies and monitoring pathologies over time. The current document is directed to methods for determining the positioning of model surfaces within voxels, referred to generally as "sub-voxel-resolution model refinement." In order to achieve sub-voxel-resolution model refinement, additional information is needed.

FIG. 6 illustrates the intensity profile of a particular type of tissue. In a first plot 602, in the upper portion of FIG. 6, a portion of the grayscale is represented by a horizontal axis 604 and the intensity measured for the tissue by a medical-imaging device at each grayscale value is plotted with respect to an unseen vertical axis. The solid intensity curve 606 represents the intrinsic intensity signal generated by the tissue and the various dashed curves 608-611 represent various different types of device and detector signals, some independent of the tissue signal and others dependent on the tissue signal, referred to as "noise." The plot 620 in the lower portion of FIG. 6 shows the overall intensity profile for the particular type of tissue including both the tissue signal and noise, using the same plotting conventions as used in the first plot 602. A mean intensity for the tissue can be straightforwardly computed, by various methods, and is represented by the arrow 621. A first range of intensities about the mean, represented by arrows 622-623, is the range of intensities that represent 60% of the tissue signal. A second intensity range 624 is the range of intensities that represent 95% of the tissue signal. A third range 626 is the range of intensities that represent 100% of the signal.

FIGS. 7A-B illustrate partial-volume intensities. The intensity profiles for two different tissues are shown in FIG. 7A, using the plotting conventions used in FIG. 6. The intensity profile of a first tissue, tissue A, is represented by solid curves and the intensity profile of the second tissue, tissue B, is represented by dashed curves. The mean intensity for tissue A is represented by arrow 702 and the mean intensity for tissue B as shown by arrow 704. The 60%, 95%, and 100% intensity ranges for the two different tissues are indicated by horizontal double-headed arrows, such as the 60% intensity ranges represented by horizontal double-headed arrows 706 and 708.

FIG. 7B illustrates a partial-volume intensity. Consider a voxel and corresponding voxel volume 710 that contains a first portion of tissue A cells and a second portion of tissue B cells. As noted above, the phrase "voxel volume" denotes the volume of a patient's body corresponding to a medical-image voxel. For example, the voxel volume may contain a tiny portion of a boundary surface between the two types of tissues, such as voxel/voxel volume 508 in FIG. 5. The intensity value associated with the voxel in the medical image, as measured by a medical-imaging method, is 0.68 (712). Using the intensity profile information plotted in FIG. 7A, the percentage of each type of tissue can be estimated by various methods. Note that the mean intensity for tissue A is 0.738 (714) and the mean intensity for tissue B is 0.642 (760). In a first method, represented by expressions 718, the measured intensity is considered to be obtained by a linear combination of the fractions of the types of tissues, each multiplied by the mean tissue intensity, as represented by expression 720. Because the sum of the fractions of the tissues is 1.0, as represented by expression 721, there are two equations with two unknowns: x, the fraction of tissue A in the voxel volume and y, the fraction of tissue B in the voxel volume. The pair of equations can be evaluated to determine the numerical values of x and y, as indicated by the remaining expressions in the set of expressions 718. In a second method, represented by expressions 730, a range of values for x and y can be determined by using the extreme intensity values within the 60% intensity ranges for both tissue types 732. Thus, when the 60% intensity ranges are employed, only ranges of the tissue fractions x and y can be determined. When the 95% intensity ranges are used, because the intensity profiles of the two tissues overlap, the fractional values x and y cannot be determined. Given the tissue intensity data plotted in FIG. 7A, it is possible to determine the allowed intensity values for any combination of the two tissue types in a voxel volume 710. This is represented by plot 740 in the lower portion of FIG. 7B. The measured intensity for voxel 710, regardless of the fractional contents of the two tissue types, cannot be less than 0.44 (742) and cannot be greater than 0.86 (744). The thick portions of the plot, such as thick portion 746, represent the allowed intensity values. Thus, when a voxel volume contains two different types of tissues with two different corresponding intensity profiles, it is possible to estimate the fractional content of the two different tissue types from the measured intensity value of the voxel and also to calculate allowed intensity values for the voxel.

Figure 8A:
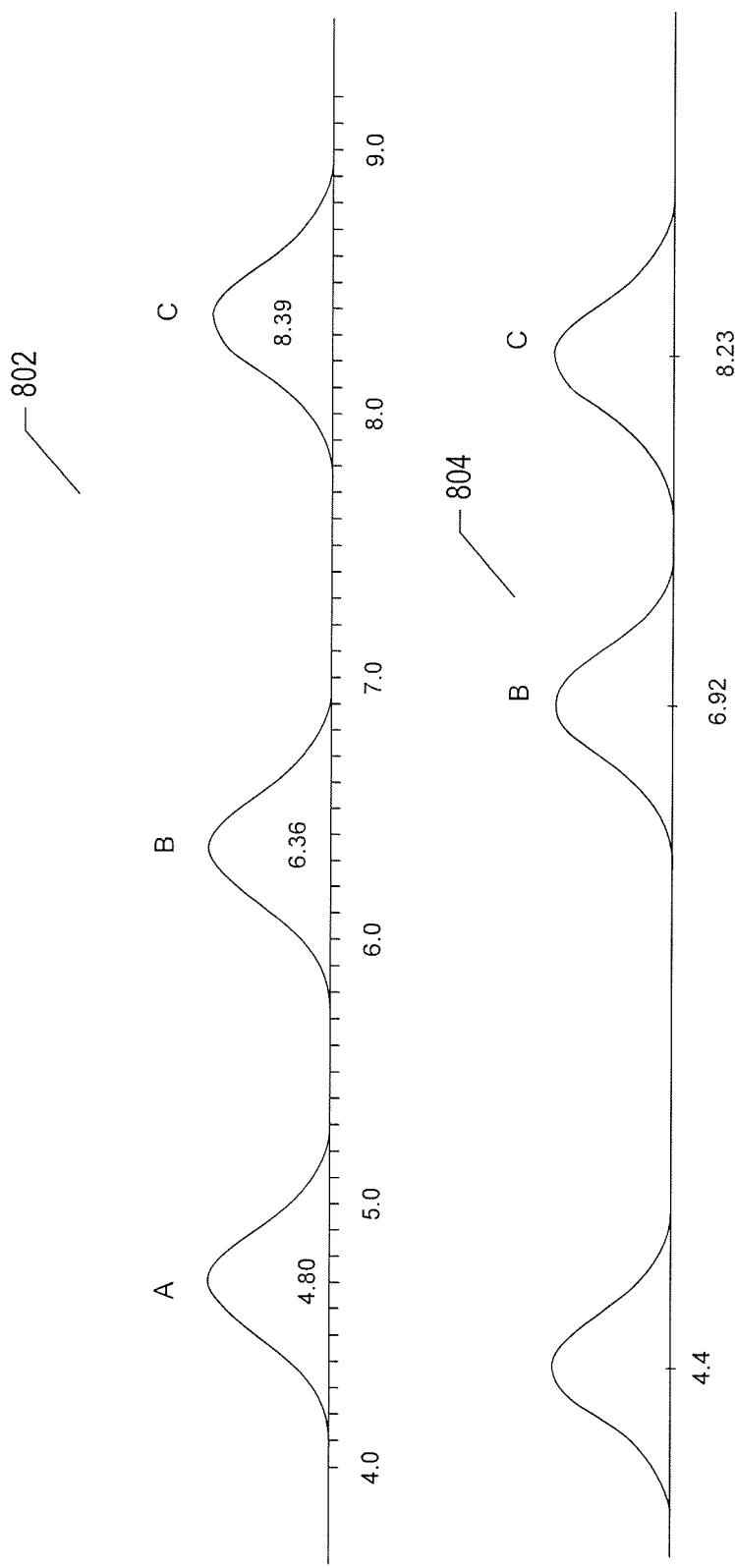
Figure 8B:
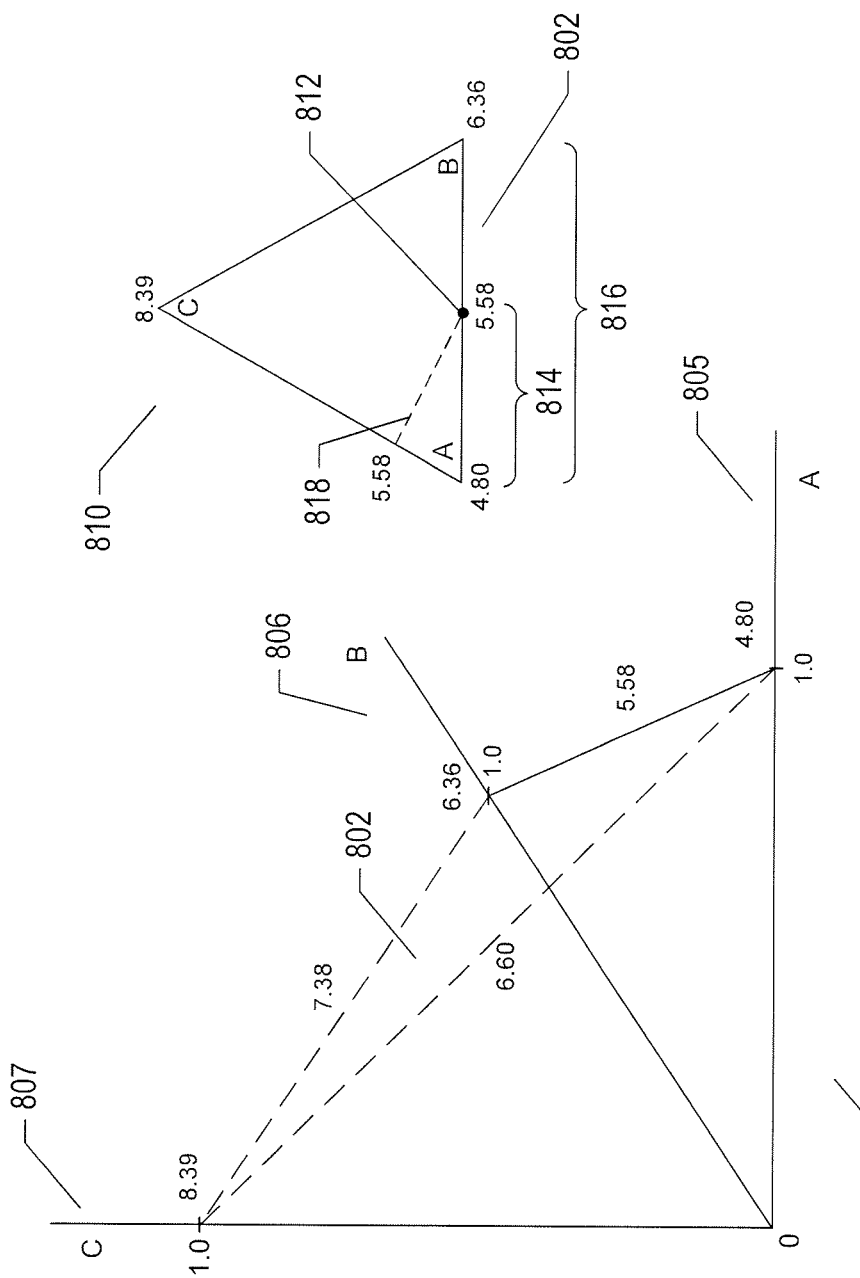

FIGS. 8A-C illustrate an example of three-way partial-volume intensity. FIG. 8A shows two different sets of intensity profiles for three tissue types A, B, and C. The first set of intensity profiles 802 are for a first type of imaging and the second set of intensity profiles 804 or for a second type of imaging. FIG. 8B illustrates the range of measured intensities for a voxel corresponding to a voxel volume containing any combination of the three tissue types. In this case, the grayscale values range from 0 to 10. Because the sum of the fractional contents of the three tissue types is 1.0, all possible voxel-volume tissue-type compositions are represented by a triangular plane portion 802 in a three-dimensional plot 804 in which each of the three orthogonal axes 805-807 represents the fractional content of a different tissue type in the voxel volume. Each point in this triangular plane portion is associated with the voxel intensity, assuming that, as in the case discussed with reference to FIG. 7B, the voxel intensity is computed as a linear combination of the fractional contents of the three tissue types multiplied by their mean intensities. The triangular plane portion is shown in two dimensions 810 on the right-hand side of FIG. 8B. The vertices are labeled with the tissue types A, B, and C, and the vertices are additionally associated with the mean intensity values for the three tissue types, obtained from the first plot 802 in FIG. 8A. The vertices represent the voxel volume containing only the single type of tissue with which the vertex is labeled. Assume that the measured intensity of the voxel is 5.58. Were the voxel volume to contain only a mixture of tissue types A and B, then the point 812 represents this measured intensity when generated by a combination of tissue types A and B. The ratio of the line segment 814 to the length of the side of the triangle 816 is the fraction of the voxel volume containing tissue type A. However, as can be easily appreciated from inspection of plot 802 in FIG. 8A, the measured intensity 5.58 may be generated by fractional contents of all three tissue types. All of these possible combinations are represented by a line segment 818 within the triangular plane portion. FIG. 8C shows the triangular plane portion 802 discussed above with reference to FIG. 8B and also shows a similar triangle 820 generated from the intensity profiles in the second plot 804 in FIG. 8A. Because the relative differences between the mean intensity values for the three tissue types is different for the second imaging technique, the dashed line 822 representing the possible fractional tissue contents that would generate the intensity value 5.58 has a different position and orientation in this second triangular plane portion 820. When the two triangular plane portions 802 and 820 are superimposed on each other, as shown by triangular plane portion 824 in FIG. 8C, the two line segments indicating the fractional tissue contents that generate the intensity value 5.58 intersect at single point 826, which represents the fractional tissue-type contents of the voxel volume. This graphical example can be reduced to a system of three equations and three unknowns, similar to expressions 718 shown in FIG. 7B. Thus, when there are N different types of tissue in a voxel volume, the intensity values for the corresponding voxel in N−1 different images obtained by different imaging techniques can be used to determine the fractional tissue-type contents of the voxel volume, providing that the relative intensity values of the tissue types are different for each of the different imaging techniques and providing that the mean intensity values for the N different tissue types are properly distributed along the grayscale. When intensity ranges, rather than mean intensities are used, then only ranges of tissue-type compositions can be determined.

Figure 9:
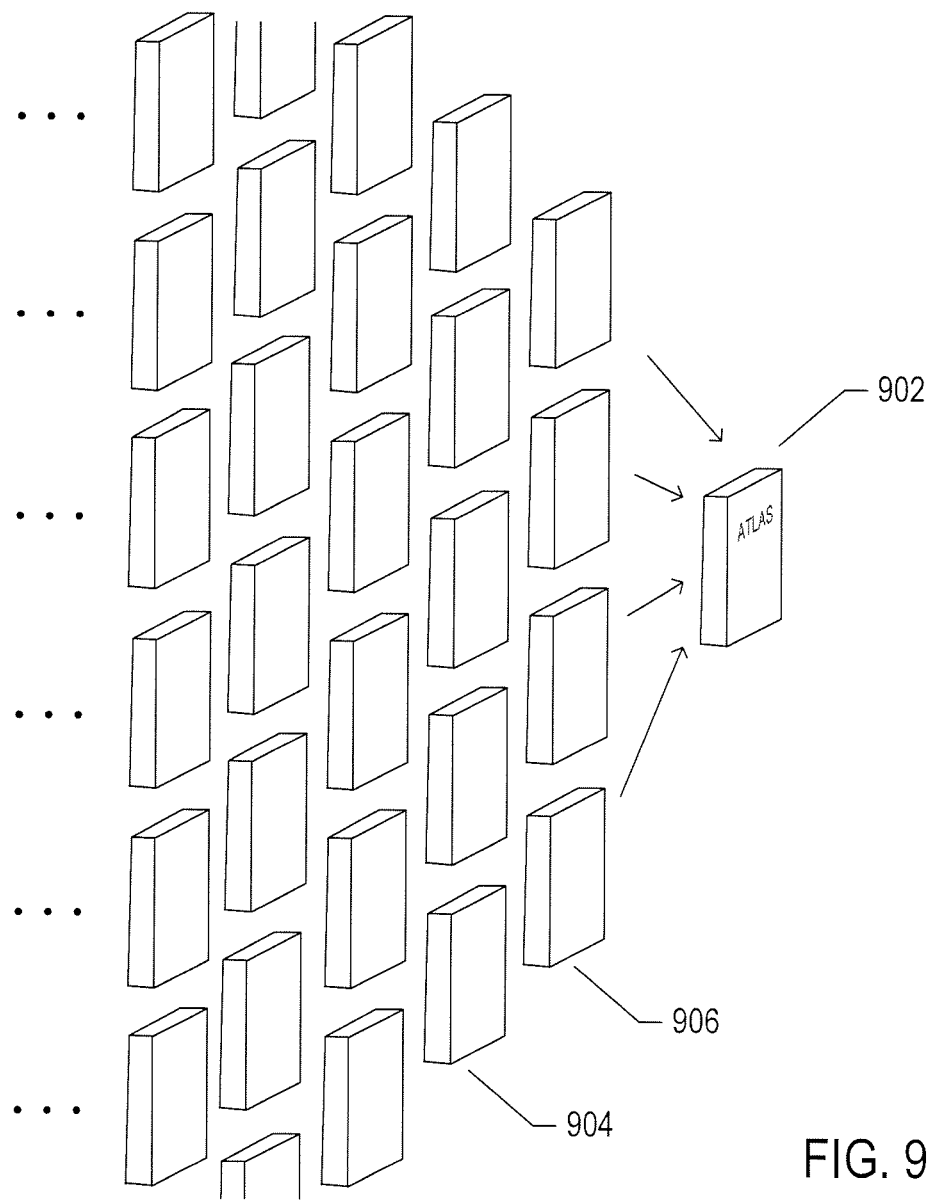
FIG. 9 illustrates a sophisticated, composite, digital anatomical atlas ("composite digital atlas") that is used in the currently disclosed methods and systems.

FIG. 9 illustrates a sophisticated, composite, digital anatomical atlas ("composite digital atlas") that is used in the currently disclosed methods and systems. This composite digital atlas is disclosed in the parent document to the current document and other related documents. To a user, the composite digital atlas 902 appears as a more or less traditional digital anatomical atlas. However, as indicated by the many additional digital anatomical atlases behind it in FIG. 9, such as digital anatomical atlases 904 and 906, the composite digital atlas includes data for many different human subjects. This allows the composite digital atlas to provide individualized anatomical volumes that better match a corresponding three-dimensional medical image than can be provided by traditional anatomical atlases.

Figure 10:
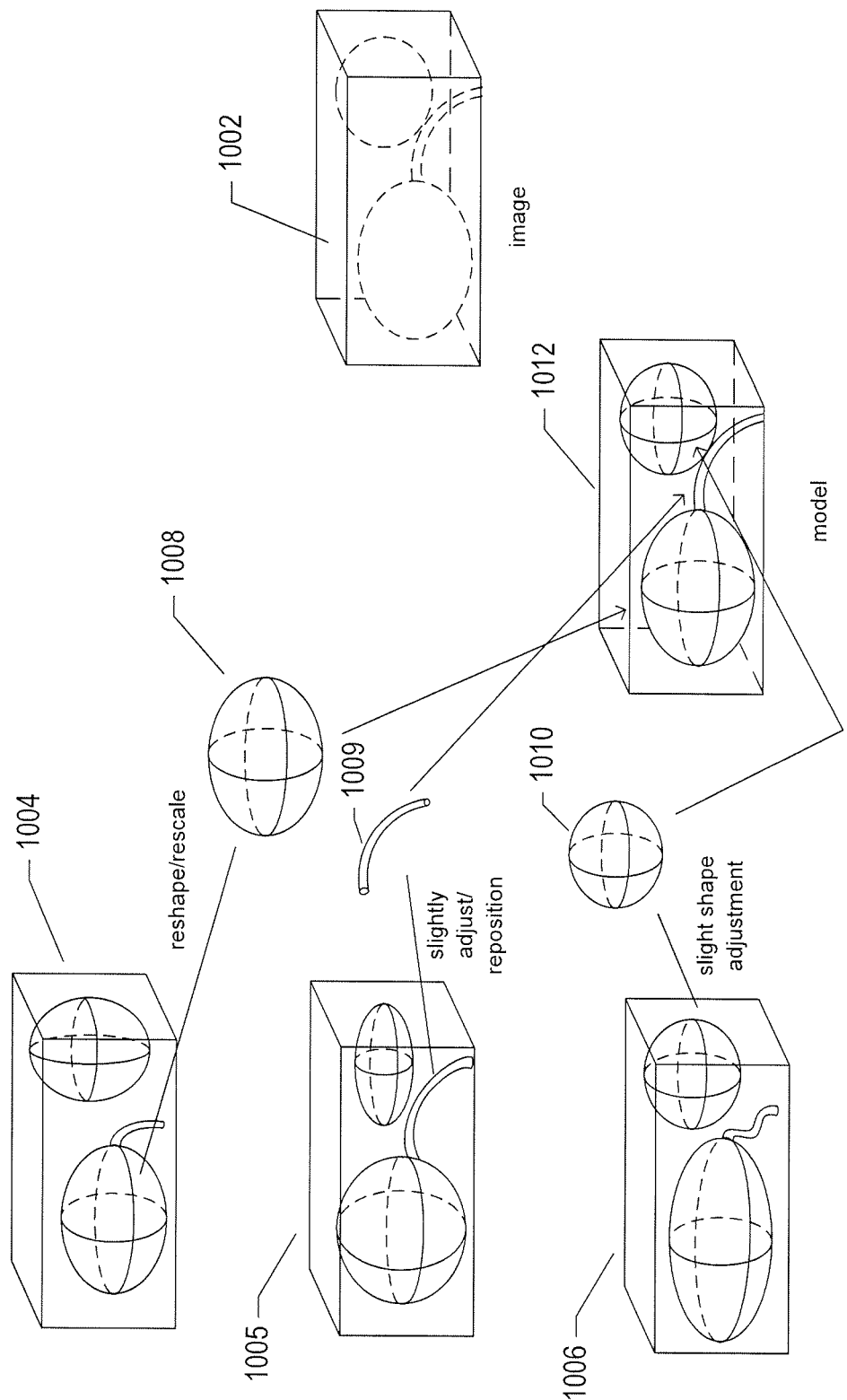
FIG. 10 illustrates a matching operation of the composite digital atlas discussed above with reference to FIG. 9.

FIG. 10 illustrates a matching operation of the composite digital atlas discussed above with reference to FIG. 9. In this operation, a three-dimensional digital image 1002 obtained by a medical imaging technique is input to the composite digital atlas. The composite digital atlas searches through all of the data for all of the different subjects maintained by the composite digital atlas to identify a number of model volumes 1004-1006 that most closely represent features within the digital image. The composite digital atlas can then extract features from these model volumes 1008-1010 and use them to construct a result model volume 1012 that closely models and corresponds to the three-dimensional digital image 1002. The composite digital atlas employs sophisticated searching technologies as well as the positioning, orientation, scaling, and warping operations discussed above with reference to FIGS. 3A-C. Furthermore, the composite digital atlas can generate a resultant model volume by optimization techniques that consider the image voxel intensities and the theoretical corresponding intensities that would be generated by equivalent volumes of the model, using the techniques discussed above with reference to FIGS. 7A-8C. In certain implementations, this may be carried out by a two-step optimization process:

$$\text{model} = \frac{\text{argmin}}{o, p, s} \sum_{v \in \text{voxel volumes in image}} [\text{model } (o, p, s, v) - \text{image } (v)]^2$$

$$\text{model} = \frac{\text{argmin}}{\text{adjustments}} \sum_{v \in \text{voxel volumes in image}} [\text{model (adjustments)} - \text{image } (v)]^2$$

In the first optimization process, the contents of the model volume corresponding to the three-dimensional digital image are positioned p, oriented o, and scaled s within the three-dimensional digital image by rigid positioning, orientation, and scaling operations to minimize the squared differences between the computed intensities, based on the model contents, and the measured voxel intensities in the three-dimensional digital image. In the second optimization process, the best-fit model obtained in the first optimization process is modified by various warping operations to produce a model that optimally explains the measured intensity values in the three-dimensional digital image. These warping operations are constrained by various physiological and biological constraints, so that the warping operations do not produce a result model that is physiologically or biologically implausible or impossible.

Figure 11A:
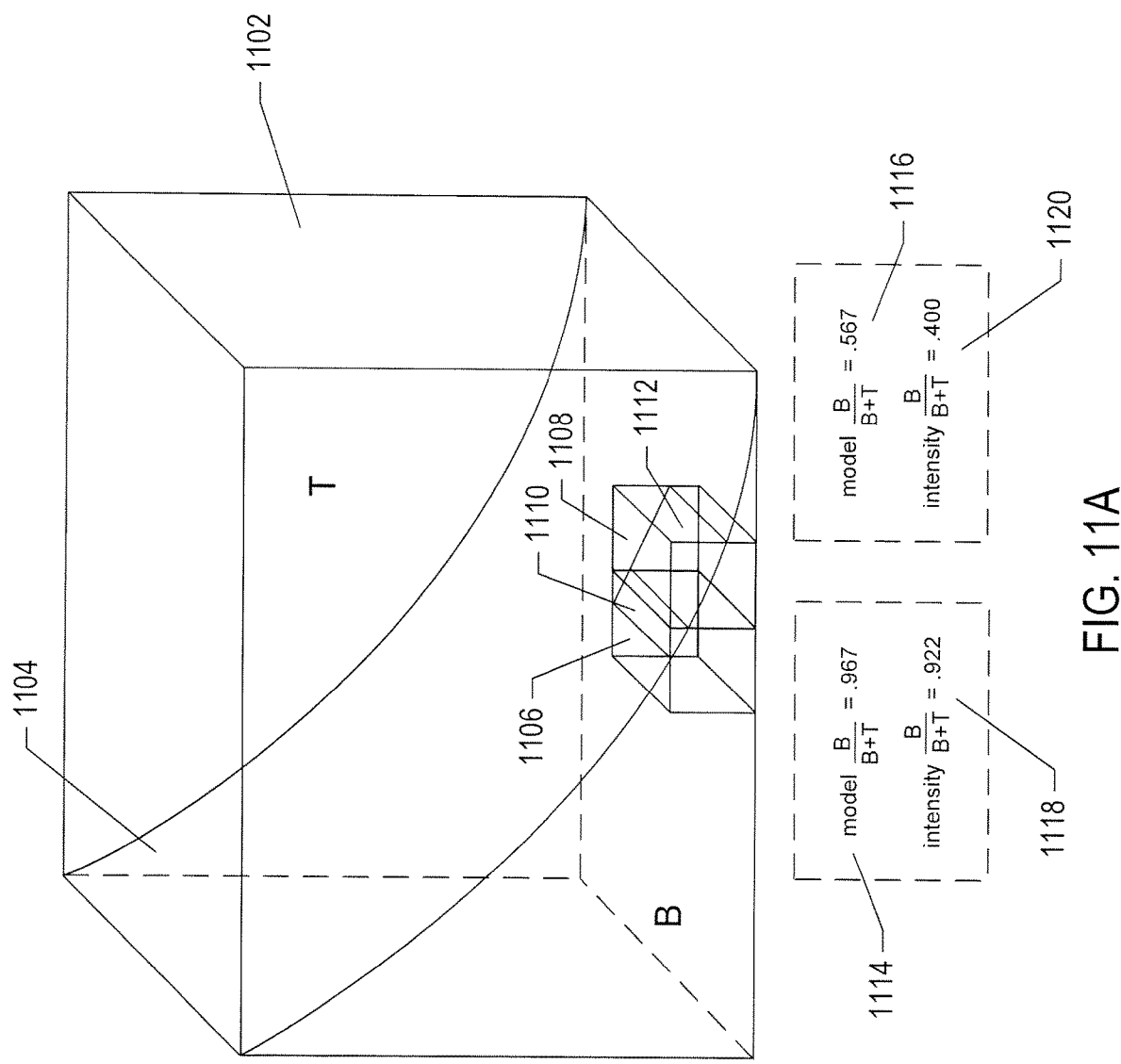
Figure 11C:
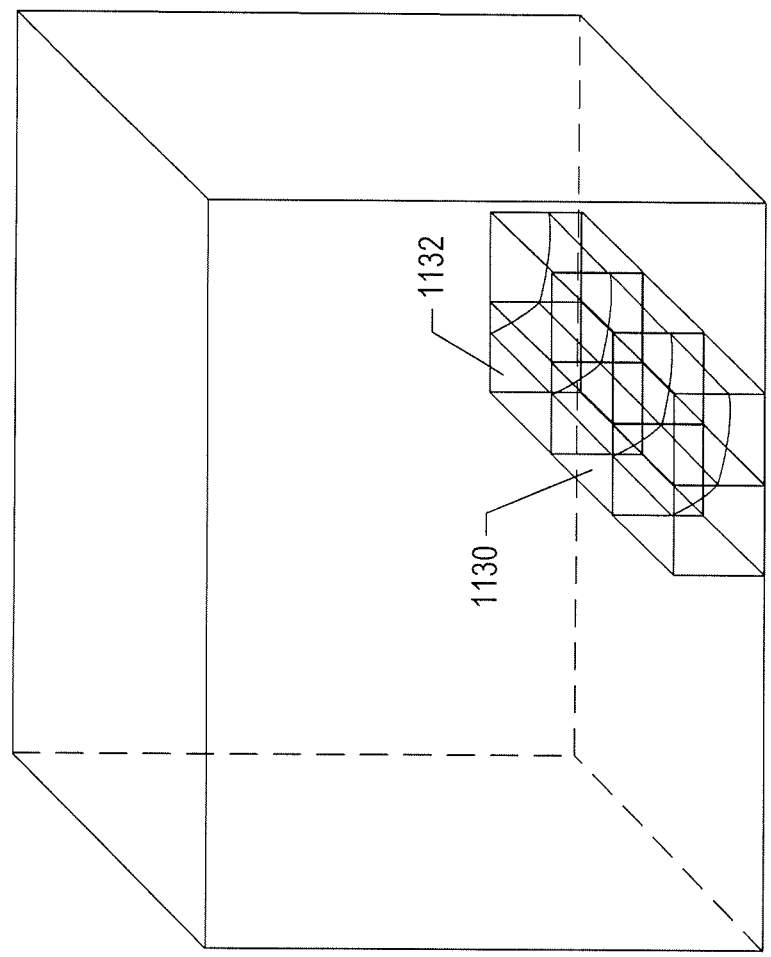
Figure 11D:
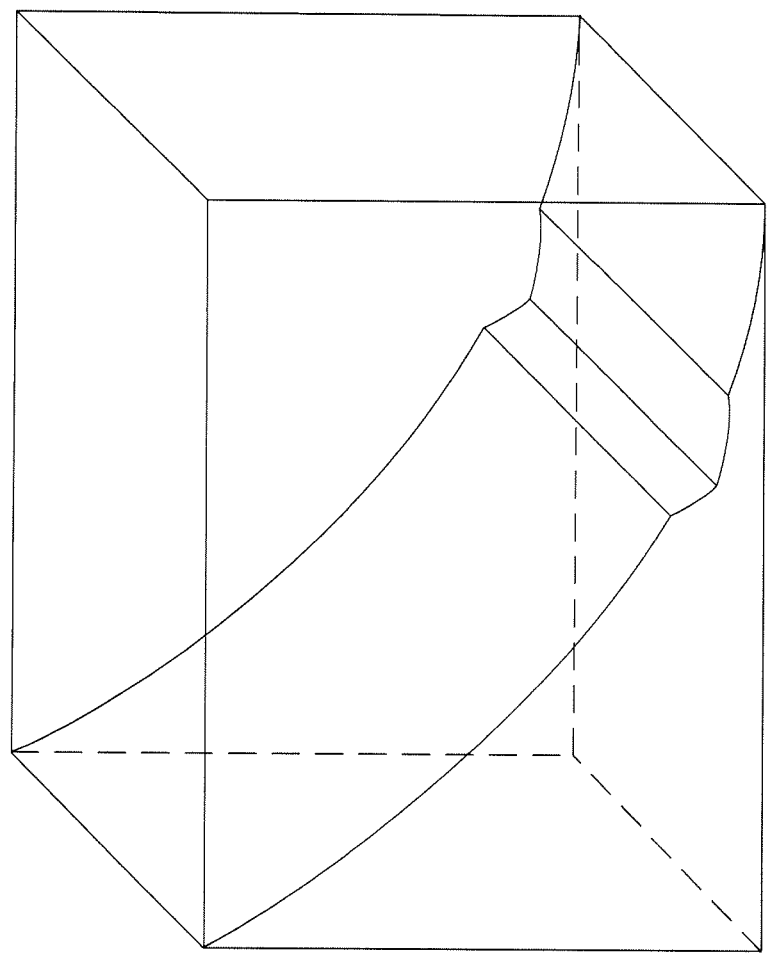

FIGS. 11A-D illustrate an example of operation of the currently disclosed sub-voxel-resolution model refinement methods and systems. FIG. 11A shows a small three-dimensional digital image 1102 in which a model tissue-boundary surface 1104 has been positioned according to an individualized model volume provided by the composite digital atlas, as discussed above with reference to FIG. 10. Two voxels 1106 and 1108 are shown within the small three-dimensional digital image. Voxel 1106 contains a tiny portion of the model tissue-boundary surface 1110 and voxel 1108 contains a larger, but still tiny, portion of the model tissue-boundary surface 1112. The methods discussed with reference to FIGS. 7A-B can be used to estimate the intensity of these voxels based on the model tissue-boundary surface and fractional tissue contents of the corresponding voxel volumes, shown by expressions 1114 and 1116, and these estimated intensities can be compared to the actual measured intensities shown by expressions 1118 and 1120. Clearly, the measured intensity values for the two voxels do not correspond to the computed intensity values based on the model. As shown in FIG. 11B, the two model tissue-boundary-surface portions can be repositioned within the voxels 1106 and 1108 so that the measured intensity values of the voxels correspond to the computed intensities from the model, as indicated by expression 1122. The repositioning, of course, must be done with consideration for the model contents of neighboring voxels and other constraints. As shown in FIG. 11C, analysis of the neighboring pairs of voxels 1130 and 1132 results in similar changes, so that, as a result, the model tissue-boundary surface has been altered, as shown in FIG. 11D, with respect to the original model tissue-boundary surface. This modification represents sub-voxel-resolution refinement of the model tissue-boundary surface, since the modification lies within sub-voxel-resolution dimensional scales.

Figure 12A:
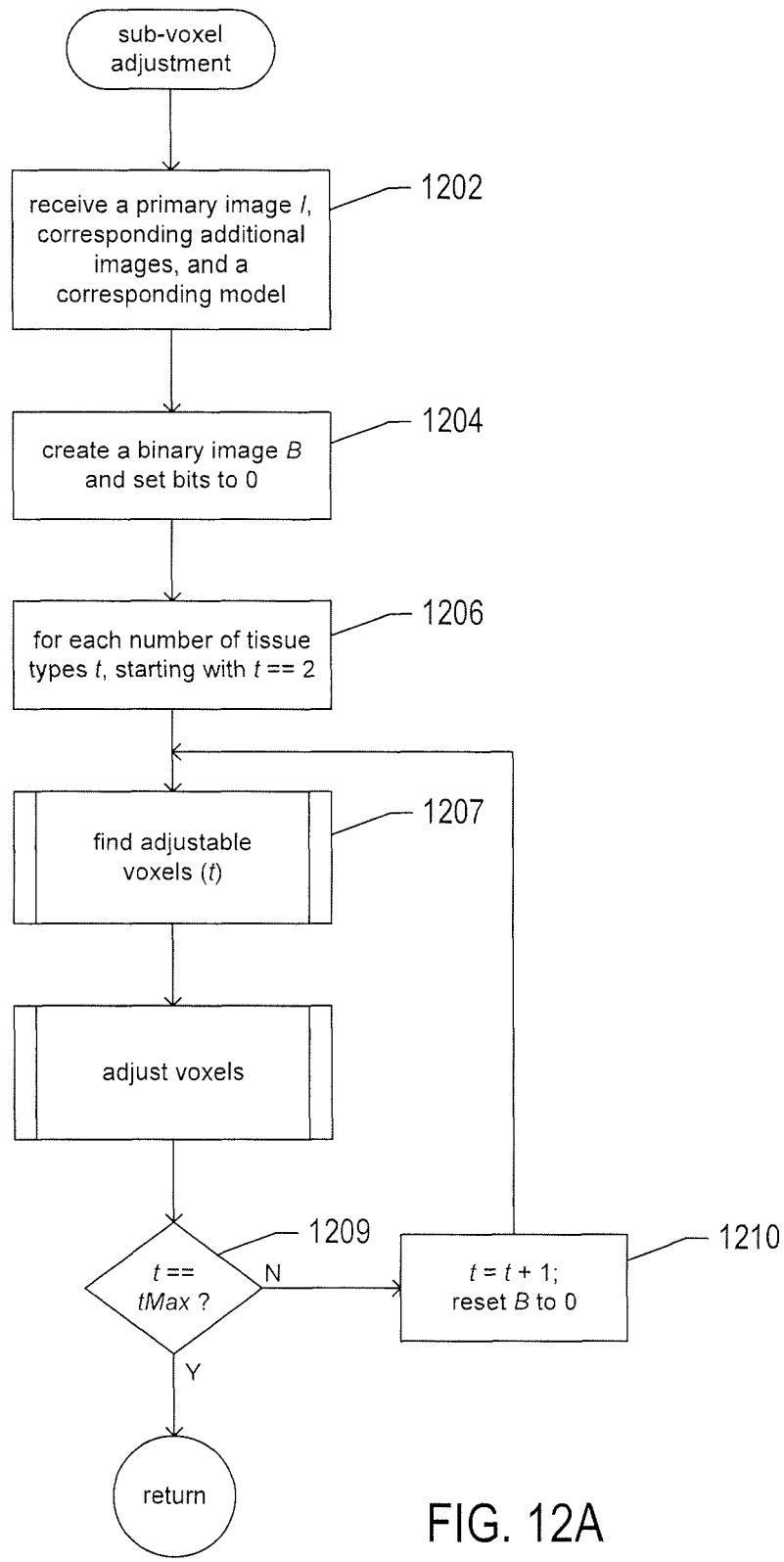
FIGS. 12A-C provide control-flow diagrams that illustrate one implementation of the currently disclosed sub-voxel-resolution model refinement methods.
Figure 12B:
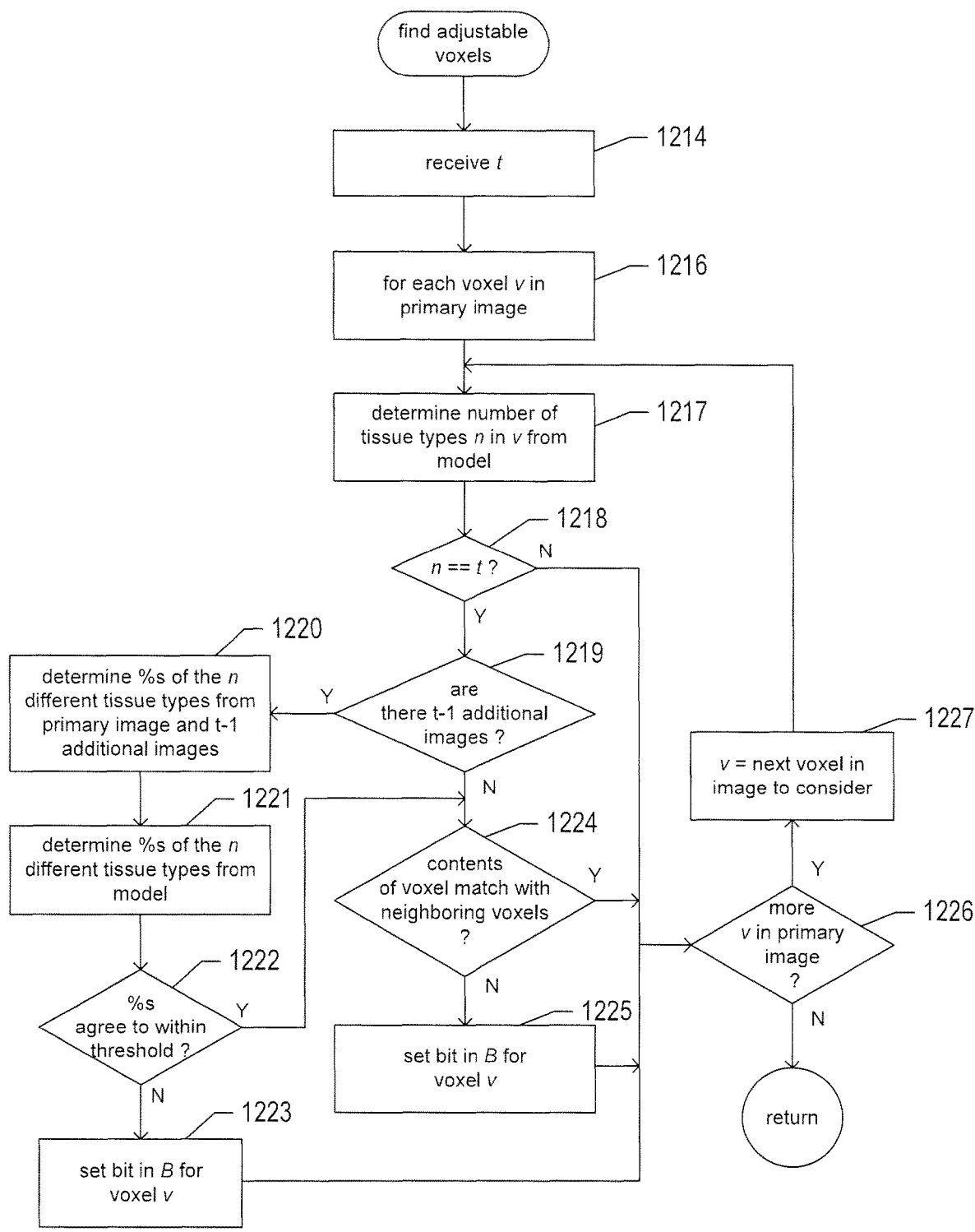
Figure 12C:
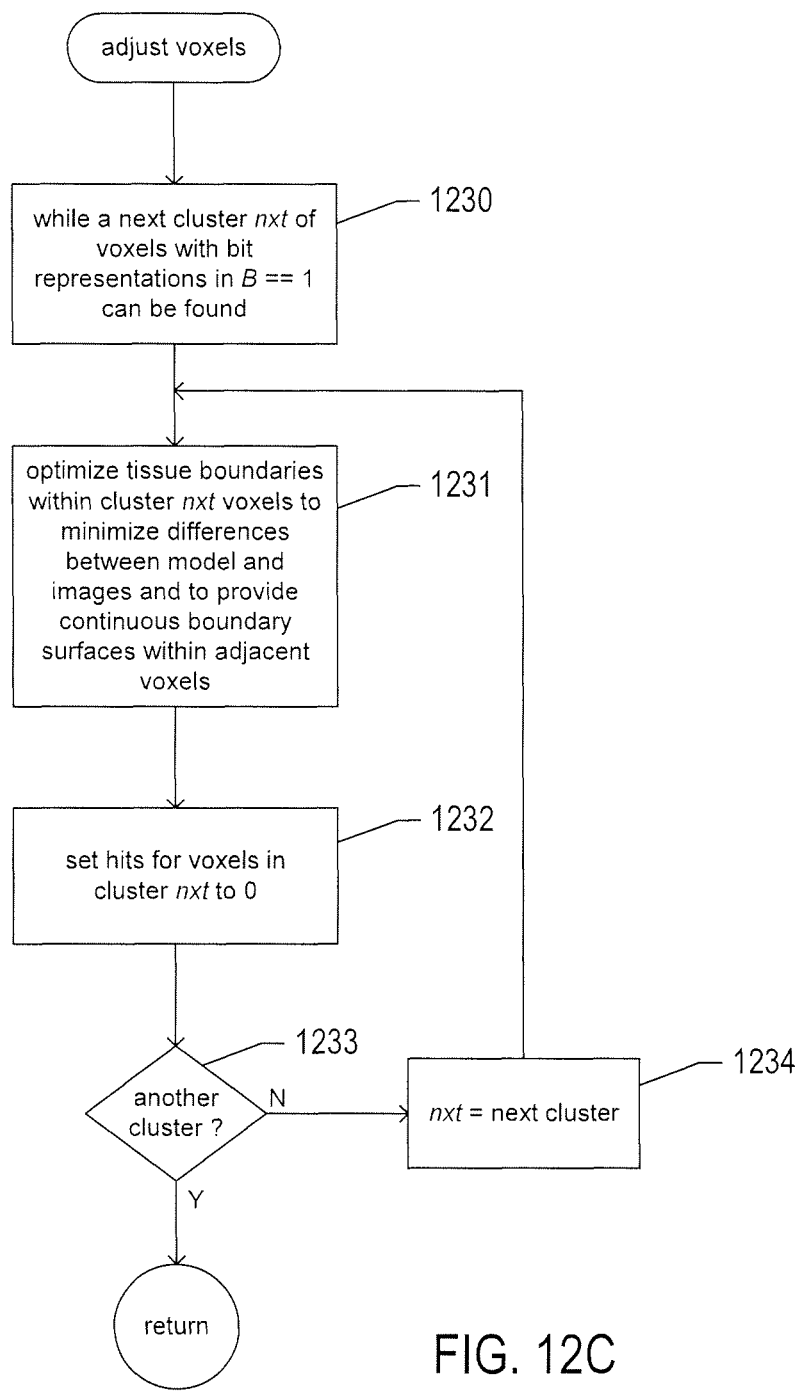

FIGS. 12A-C provide control-flow diagrams that illustrate one implementation of the currently disclosed sub-voxel-resolution model refinement methods. FIG. 12A provides a control-flow diagram for a method "sub-voxel adjustment." In step 1202, the method "sub-voxel adjustment" receives a primary three-dimensional digital medical image, zero, one, or more corresponding additional three-dimensional digital medical images obtained by different imaging techniques, and a corresponding model volume obtained from the composite digital atlas. In step 1204, the method "sub-voxel adjustment" creates a binary image B that contains one bit for each voxel in the primary image, and sets all of the bits to 0. In the for-loop of steps 1206-1210, the method "sub-voxel adjustment" considers voxels and corresponding voxel volumes with increasing numbers of tissue types, starting with two tissue types. The number of tissue types in the voxel volumes is obtained from the corresponding model volume. The method "sub-voxel adjustment" starts with voxels and corresponding voxel volumes containing two tissue types since the fractional tissue-type contents of these voxels can be more accurately determined than in the case of voxel volumes containing three or more tissue types, due to the fact that multiple images need not be registered, in the two-tissue case, and due to the fact that, when intensity ranges for the tissue types are considered, the resulting computed intensity ranges for two-tissue voxel volumes when tissue-type intensity profiles overlap tend to be narrower than for three-tissue voxel volumes. For each different type of voxel considered in the for-loop of steps 1206-1210, the method "sub-voxel adjustment" calls the routine "find adjustable voxels," in step 1207, to determine which voxels of the currently considered type may need adjustment and then, in step 1208, calls the routine "adjust voxels" to adjust the portions of the model within the voxels so that the computed intensities for the voxels are as close as possible to the measured intensities provided by the three-dimensional digital image. The for-loop of steps 1206-1210 continues until the number of tissue types in a voxel reaches a maximum value, as determined in step 1209.

FIG. 12B provides a control-flow diagram for the routine "find adjustable voxels," called in step 1207 of FIG. 12A. In step 1214, the routine "find adjustable voxels" receives the number of tissue types t for the voxels and corresponding voxel volumes to be considered. In the for-loop of steps 1216-1227, the routine "find adjustable voxels" considers each voxel v in the primary image. For the currently considered voxel v, the routine "find adjustable voxels" determines, in step 1217, the number of tissue types in the corresponding voxel volume by considering the corresponding model volume. When the number of tissue types is not equal to t, as determined in step 1218, control flows to step 1226, where it is determined whether there are more voxels v in the image to consider. When there are more voxels to consider, the next voxel is selected, in step 1227, in preparation for another iteration of the for-loop of steps 1216-1227. When the number of tissue types in the voxel volume corresponding to the currently considered voxel v is equal to t, as determined in step 1218, control flows to step 1219, where the routine "find adjustable voxels" determines whether there are sufficient additional images to determine the percentage compositions of the tissue types in the voxel volume. If so, then, in step 1220, the fractional amount of tissue types are determined by the methods discussed above with reference to FIGS. 7A-8C. In step 1221, the routine "find adjustable voxels" determines the tissue-type composition of the currently considered voxel volume from the corresponding model volume. In step 1222, the routine "find adjustable voxels" determines whether the tissue-type composition computed from the model agrees with the intensity-based tissue-type composition to within a threshold level of agreement. If not, then, in step 1223, a bit is set in the binary image B to indicate that the currently considered voxel may need model adjustment. Otherwise, control flows to step 1224, where the routine "find adjustable voxels" determines whether or not the current model contents of the currently considered voxel are aligned with the contents of neighboring voxels. If not, then a bit is set in the binary image B to indicate that the currently considered voxel may need model adjustment. The for-loop of steps 1216-1227 continues to iterate until all voxels in the primary three-dimensional digital image have been considered.

FIG. 12C provides a control-flow diagram for the routine "adjust voxels," called in step 1208 of FIG. 12A. The routine "adjust voxels" comprises a while-loop of steps 1230-1234 in which each cluster of adjacent voxels for which the corresponding bits in the binary three-dimensional digital image B have been set are subject to sub-voxel-resolution model adjustment. In step 1231, an optimization method is carried out on the currently considered cluster of voxels to minimize the difference between the image-volume intensities for the voxels and the intensities for the voxel volumes computed from the model. Any of many various different optimization methods can be employed, similar to the above-discussed optimization methods carried out by the composite digital atlas to generate a result model. The model features within the voxel may be repositioned and warped, but are constrained by physiological and biological traits as well as by the need for model features within the voxel to align with model features in neighboring voxels. In step 1232, once the currently considered cluster of voxels has been subject to model adjustment, the bits in the binary image B for these voxels are set to 0.

Although the present invention has been described in terms of particular embodiments, it is not intended that the invention be limited to these embodiments. Modification within the spirit of the invention will be apparent to those skilled in the art. For example, any of a variety of different implementations of the currently disclosed methods and systems that carry out sub-voxel-resolution model adjustment can be obtained by varying any of many different design and implementation parameters, including modular organization, programming language, underlying operating system, control structures, data structures, and other such design and implementation parameters. As mentioned above, many different possible optimization methods are possible for optimizing model features within voxels. In addition, a variety of computational methods can be employed to more efficiently process the large numbers of voxels than by sequentially processing the voxels, as done in the above-discussed implementation. These methods may organize and cluster voxels by the number of tissue types, for example, so that the total number of voxels need not be repeatedly considered in each iteration of the for-loop shown in FIG. 12B.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method that adjusts and refines, to a sub-voxel resolution, anatomical information at a sub-voxel dimensional scale in order to incorporate intensity information, contained in a primary medical image that contains multiple voxels and n additional medical images that each contains multiple voxels, into the anatomical information, the method comprising:
   receiving references to the primary medical image and the n additional medical images;
   for each voxel of a set of voxels within the primary medical image that each corresponds to a voxel volume within the anatomical information,
      determining a number and types of different tissues in the voxel volume,
      when there is sufficient intensity data associated with the voxel, in one or more of the primary medical image and the n additional medical images, to estimate a fractional tissue content of the voxel,
         estimating the fractional tissue contents of the voxel from the intensity data,
         determining a fractional tissue contents of the voxel volume from the anatomical information, and
         when the determined fractional tissue contents of the voxel differs from the fractional tissue contents of the voxel volume by at least a threshold difference, adjusting the anatomical information at the sub-voxel dimensional scale within the voxel volume so that the fractional tissue contents of the voxel differ from the fractional tissue contents of the voxel volume by less than the threshold difference; and
   adjusting the anatomical information at the sub-voxel dimensional scale within any additional voxel volumes containing misaligned portions of features that span multiple voxel volumes so that the features that span multiple voxel volumes are aligned at the boundaries between adjacent voxel volumes.

2. The method of claim 1 wherein the anatomical information is contained in, or generated from, one or more digital anatomical models which may include one or more composite digital atlases that each includes data for many different imaging subjects.

3. The method of claim 2
   wherein the primary medical image is input to one or more digital atlases or to an anatomical-information generator that generates anatomical information from one or more digital atlases.

4. The method of claim 3
   wherein the primary medical image is input to one or more digital atlases;

wherein, in response, the one or more composite digital atlases;
   search through the data for the different subjects to identify a number of model volumes that most closely represent features within the primary medical image,
   extract features from these model volumes, and
   uses the extracted features to generate a result model volume that closely models and corresponds to the primary medical image; and
wherein, multiple result model volumes are generated, generating a final result model volume from the multiple result model volumes.

5. The method of claim 3
wherein the primary medical image is input to the anatomical-information generator;
wherein, in response, the anatomical-information generator
   generates features from anatomical information contained in the one or more digital atlases, and
   uses the generated features to, in turn, generate a result model volume that closely models and corresponds to the primary medical image.

6. The method of claim 3 wherein the one or more composite digital atlases employ positioning, orientation, scaling, and warping operations to generate the result model volume.

7. The method of claim 1 wherein the fractional tissue contents of the voxel volume is directly computed by determining the portion of the voxel volume corresponding to each tissue type.

8. The method of claim 1 wherein, when the voxel volume contains tissues of only two types, the fractional tissue contents of the voxel is computed from an intensity associated with the voxel in the primary medical image and the fractional tissue contents of the voxel volume.

9. The method of claim 8 wherein the fractional tissue contents of the voxel is computed by solving a system of two linear equations, including an equation in which the sum of two terms, each term the product of a mean intensity for a tissue type and the fractional tissue content of the voxel for that tissue type, is equal to the intensity associated with the voxel and including an equation in which the sum of the fractional tissue content for each tissue type in the voxel is equal to 1.0.

10. The method of claim 8 wherein a fractional-tissue-content range for each tissue in the voxel is computed by
   determining, from tissue intensity profiles, an intensity range for each tissue type;
   using the minimum value in the intensity range for a first tissue type and the minimum value in the intensity range for a second tissue type, determining a maximum fractional tissue content for the first tissue type;
   using the maximum value in the intensity range for the first tissue type and the maximum value in the intensity range for the second tissue type, determining a minimum fractional tissue content for the first tissue type; and
   determining corresponding minimal and maximal fractional tissue contents for the second tissue type.

11. The method of claim 1 wherein, when the voxel and voxel volume contain m types of tissue, where m is less than or equal to n+2, the fractional tissue contents of the voxel is computed from an intensity associated with the voxel in the primary medical image and in m−2 of the n additional medical images by solving a system of m linear equations.

12. The method of claim 1 wherein, when the voxel and voxel volume contain m types of tissue, where m is less than or equal to n+2, a fractional-tissue-content range for each tissue type in the voxel is computed by
   for each tissue type,
      using the minimum value in the intensity range for the tissue type and the minimum values in the intensity ranges for the remaining m−1 tissue types, determining a maximum fractional tissue content for the tissue type; and
      using the maximum value in the intensity range for the tissue type and the maximum value in the intensity ranges for the remaining m−1 tissue types, determining a minimum fractional tissue content for the tissue type.

13. The method of claim 1 wherein the anatomical information at the sub-voxel dimensional scale within the voxel volume is adjusted so that the fractional tissue contents of the voxel differ from the fractional tissue contents of the voxel volume by less than the threshold difference by:
   using a first optimization technique that searches through various position, orientation, and scaling adjustments of the anatomical information at the sub-voxel dimensional scale within the voxel volume to find a set of position, orientation, and scaling adjustments that minimize a squared difference between the computed fractional tissue contents of the corresponding voxel and the fractional tissue contents of the voxel volume; and
   using a second optimization technique that searches through various warping adjustments of the anatomical information at the sub-voxel dimensional scale within the voxel volume to find a set of warping adjustments that minimize a squared difference between the computed fractional tissue contents of the corresponding voxel and the fractional tissue contents of the voxel volume.

14. The method of claim 1 wherein the anatomical information at the sub-voxel dimensional scale within voxel volumes is adjusted so that the fractional tissue contents of the corresponding voxels differ from the fractional tissue contents of the voxel volumes by less than the threshold difference and wherein the anatomical information at the sub-voxel dimensional scale within voxel volumes is adjusted so that features that span multiple voxel volumes are aligned at the boundaries between adjacent voxel volumes by one or more optimization methods that search through various position, orientation, scaling, and warping adjustments of the anatomical information at the sub-voxel dimensional scale within the voxel volume in order to find a set of position, orientation, scaling, and/or warping adjustments that minimize a squared difference between the fractional tissue contents of the voxel volumes and the computed fractional tissue contents of the corresponding voxels constrained by feature-alignment constraints.

15. The method of claim 14 carried out cluster-by-cluster on clusters of adjacent voxel volumes that need adjustments to the anatomical information at the sub-voxel dimensional scale so that the fractional tissue contents of the voxels differ from the fractional tissue contents of the voxel volumes by less than the threshold difference and so that features that span multiple voxel volumes are aligned at the boundaries between adjacent voxel volumes.

16. The method of claim 14 carried out voxel-volume-set-by-voxel-volume-set for voxel-volume sets, and corresponding voxel sets, containing voxel volumes with identical numbers of tissue types, with voxel-volume sets with lower numbers of tissue types adjusted prior to adjustment of voxel-volume sets with larger numbers of tissue types.

17. The method of claim 1 wherein the anatomical information includes the shapes, positions, and orientations of volumes of each type of tissue present in the organism, or portion of the organism, described by the anatomical information.

18. The method of claim 1 wherein the intensity information associated with each voxel of a medical image includes one or more numerical values, each numerical value selected from a corresponding range of possible numerical values.

19. The method of claim 1 implemented in a computer system.

\* \* \* \* \*